J. H. MARTIN, Jr.
THERMOSTATIC TRAP OR VALVE.
APPLICATION FILED JAN. 2, 1914.
1,094,666.
Patented Apr. 28, 1914.
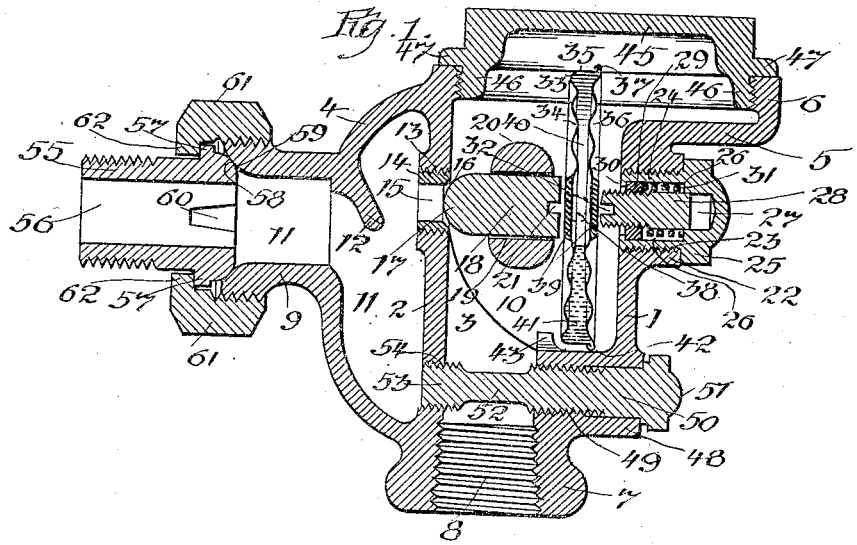
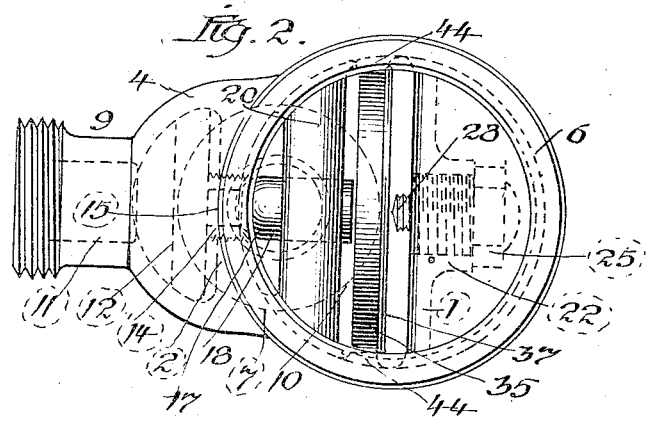
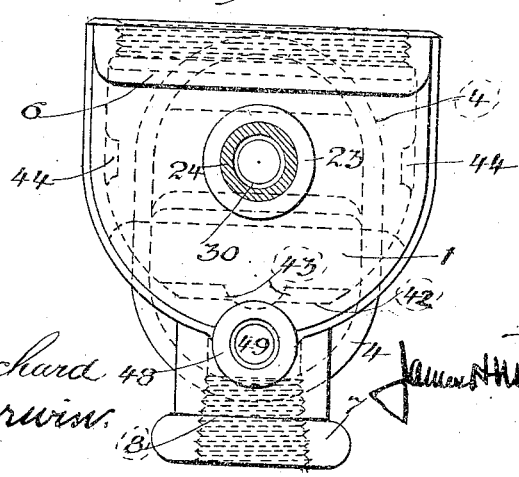
Witnesses:
Frank B. Blanchard
Louis M. Berwin
Inventor:
James H. Martin Jr.

UNITED STATES PATENT OFFICE.

JAMES H. MARTIN, JR., OF CHICAGO, ILLINOIS, ASSIGNOR TO CHARLES P. MONASH, OF CHICAGO, ILLINOIS.

THERMOSTATIC TRAP OR VALVE.

1,094,666.

Specification of Letters Patent.   Patented Apr. 28, 1914.

Application filed January 2, 1914.   Serial No. 809,984.

*To all whom it may concern:*

Be it known that I, JAMES H. MARTIN, Jr., a citizen of the United States, residing at Chicago, in the county of Cook and State of Illinois, have invented certain new and useful Improvements in Thermostatic Traps or Valves, of which the following is a specification.

The invention relates to that type of thermostatic traps or valves in which a chambered diaphragm or capsule containing a volatile liquid or medium furnishes the active member of the trap or valve, said member having the property of expanding and contracting under the effects of heat and cold on the volatile liquid or medium,—heat causing the liquid or medium to vaporize and expand the diaphragm or capsule and cold causing a return of the vaporized liquid or medium to its normal state and allowing the diaphragm or capsule to contract.

It has been found in actual practice that thermostatic traps or valves employing a chambered diaphragm or capsule and an expansible liquid or medium as heretofore constructed are objectionable in several respects, among the most pronounced of which may be mentioned the liability of the chambered diaphragm or capsule becoming ruptured, broken or disabled in some way, the constant requirement of readjustment of the parts, the difficulty in removing the trap or valve for readjustment or repairs, the imperfect construction and arrangement of the chambered diaphragm or capsule and the valve actuated thereby, and the unreliability of the trap or valve for use unless constantly inspected and overhauled.

The objects of the present invention are to overcome the serious objections found in thermostatic traps having a chambered diaphragm or capsule containing a volatile or expansible liquid or medium; to improve the construction and arrangement of the shell or casing by providing an inlet passage for the water and a water discharging chamber in communication one with the other, and an inlet passage for the water discharging chamber; to locate the chambered diaphragm or capsule in the water discharging chamber so that it can be readily and quickly inserted and removed without disconnecting the trap or valve; to furnish a slidable valve disconnected from the chambered diaphragm or capsule and adapted to be opened by the inrushing or inflowing water and closed by the chambered diaphragm or capsule to control the port between the water inlet passage and water discharging chamber; to prevent ill effects of over-expansion of the chambered diaphragm or capsule by a yieldable bumper in engagement with the chambered diaphragm or capsule; to support the chambered diaphragm or capsule between a slidable valve member and a yieldable bumper member; to prevent sediment and dirt from entering the water discharging chamber and adhering to the chambered diaphragm or capsule; to enable the trap or valve to be readily blown out or cleaned; and to improve generally the construction, arrangement and operation of the parts or elements entering into the structure of the valve as a whole.

The invention consists in the several parts and combination of parts hereinafter described and pointed out in the claims as new.

In the drawings: Figure 1. is a sectional elevation showing the trap or valve open for discharging the water of condensation; Fig. 2. a top or plan view with the cover removed; and Fig. 3. an end elevation.

The trap or valve of the present invention has a shell or casing with an outer vertical wall (1), an intermediate vertical wall (2), a peripheral wall (3), and an outer wall (4), which walls constitute the main body of the shell or casing. At the upper end of the shell or casing is a lateral wall or flange (5), and a vertical annular wall or flange (6) furnishing an opening for inserting and withdrawing the chambered diaphragm or capsule. At the bottom of the shell or casing is a neck (7) surrounding the discharge or outlet passage (8), and as shown the neck (7) has an interior screw thread for attaching the trap or valve to a return or discharge pipe as usual. The wall (4) has a laterally extending or projected neck (9) for attaching the trap or valve to a radiator or heating unit in the usual manner.

A chamber (10) is formed between the walls (1), (2) and (3) and at its bottom is open to the outlet or discharge passage (8); and this chamber (10) constitutes a water discharging chamber. An inlet passage

(11) is formed between the walls (2) and (4) and this inlet passage (11) extends into and through the neck (8), and constitutes an inlet passage for supplying or conveying the water of condensation to the water discharging chamber (10) to be discharged therefrom. The curved lower part or section of the inlet passage (11) also serves as a sediment chamber into which the sediment and dirt carried by the inflowing water of condensation will be deposited and retained against entering into the water receiving and discharging chamber, thus maintaining the water discharging chamber free from sediment and dirt. As shown a depending baffle plate or deflector (12) in the inlet passage serves to deflect the inflowing water downward, thus insuring the deposit of the sediment and dirt at the bottom of the curved or lower section of the inlet passage.

The wall (2) has therein a threaded hole (13) into which is entered a threaded bushing (14), the opening of which forms a port (15), furnishing communication between the chamber (10) and the inlet passage (11) for water of condensation to flow into the chamber (10) through the port. As shown the port (15) is located above the lower edge of the baffle plate or deflector (12) thus guarding the port (15) against the direct flow of sediment and dirt into and through the port to enter the chamber (10) with the water of condensation. The inner end of the bushing (14) has a seating face (16) around the end of the port (15), which seating face (16), as shown, is beveled, but could be otherwise formed; and the seating face (16) has co-acting therewith a seating face (17) on a slidable valve (18), which seating face (17) as shown is rounded or semi-spherical in shape, but could be otherwise formed; so long as the two seating faces co-act to close the port (15), when the slidable valve (18) is advanced, and to open such port when the slidable valve is receded.

The slidable valve (18) is arranged horizontally and is loosely mounted in a hole or guideway (19) therefor in a cross-bar or support (20) extending across the chamber (10) and formed integral with or otherwise attached to the peripheral or annular wall of the shell or casing, but the valve (18) could be otherwise mounted so as to have a horizontal position and be free to slide forward and backward for its acting end to close and open the port (15) as required in the operation of the trap or valve. The valve (18) is advanced or moved forward by the action of the chambered diaphragm or capsule, and is receded or moved backward by the pressure of the water against its seating end. The base or rear end of the valve (18), in the construction shown, has a cross-slot or nick (21) for engagement with a screw-driver or other instrument by means of which the valve (18) can be rotated to properly grind the seating faces (16) and (17) and make a close fit between such faces.

A boss (22) is formed on the wall (1) and has a threaded hole (23) which receives the threaded body (24) of a plug having a head (25) suitably formed to be engaged by a wrench or other tool for entering the body of the plug into the threaded hole (23) therefor. The body (24) of the plug has a chamber (26) and the head (25) of the plug has a hole (27) into which enters the end of a slidable bumper (28), which bumper has a threaded section for a nut (29) entered into the chamber (26) of the body (24) of the plug and held against end removal or coming out by an inturned lip (30) on the end of the plug body (24) in the construction shown, but the nut (29) could be otherwise held in place. A coil spring (31) is located around the plug body (24) and between the nut and the end shoulder of the chamber (26), which spring serves to hold the bumper with its acting or engaging end projected and at the same time permits the bumper as a whole to yield or slide inwardly in case an excessive pressure is exerted against the projected acting or engaging end of the bumper, which excessive pressure would occur in the event of any over expansion of the chambered diaphragm or capsule, or from an excess of backward or receding movement of the controlling valve (18) caused by a sudden inrush or extra force of the incoming water of condensation. As shown, the outer or projected end of the bumper (28) has a cross-slot or nick (32) for the reception of a screwdriver, or other tool, or device, by means of which the bumper can be properly adjusted in relation to the chambered diaphragm or capsule.

The chambered diaphragm or capsule (33), is located between the horizontally slidable valve (18) and the horizontally yieldable bumper (28) and stands vertically or upright. The chambered diaphragm or capsule (33), as shown, is formed of a dish shaped section having a corrugated side wall or plate (34) and a peripheral wall or plate (35), and a corrugated cover or side wall or plate (36) attached to the peripheral wall (35) by a brazed overlapped or seamed joint (37), or in any other suitable manner so as to furnish a liquid and vapor tight joint against the escape of the liquid and vapor from the chamber of the diaphragm or capsule. The chambered diaphragm or capsule (33) is made of thin sheet metal stamped or otherwise formed into shape, and as shown the side walls or plates (34) and (36) have at the center a flat disk (38) which is depressed in relation to the outer rim or peripheral wall (35) so as to give each side wall an inward flare toward the center, by which the expansion will be exerted from the center outwardly with but little, if any, strain on the peripheral joint, thus preventing to a great extent, the breaking or rupturing at the joint and also increasing the life and durability of the chambered diaphragm or capsule. The flat center (38) of each side wall or plate has secured thereto a buffer plate or stiffening plate (39) to give additional strength at this point to resist the force or pressure against breaking, bending or rupturing the side walls or plates in expanding to seat the slidable valve. The chamber (40) of the diaphragm or capsule contains a volatile liquid or medium (41), such for instance as a mixture of alcohol and water in proper proportions for heat to create the vapor required to expand the walls or plates of the diaphragm or capsule the necessary distance to seat the slidable valve (18) and close the port (15) against the admission of steam. The chambered diaphragm or capsule (33) rests at its lower edge on a ledge or shoulder (42) and is guided and held in place at its lower edge by a lug (43) and is supported and held edgewise between the slidable valve (18) and yieldable bumper (28) by lugs (44) on the peripheral wall (3) of the shell or casing. The diameter of the chambered diaphragm or capsule and the relation thereto of the bottom ledge or shoulder (42) and the side lugs (44) is such as to bring the centers (38) and buffer plates (39) in axial alinement horizontally with the slidable valve (18) and yieldable bumper (28), and the slidable valve (18) is located in horizontal alinement with the port (15) so that the horizontal expansion of the walls or plates (34) and (36) from the center outward will be in direct line with the horizontal movement of the slidable valve, thus insuring the closing of the valve in direct line with the movement of the center of the chambered diaphragm or capsule.

The open upper end of the shell or casing is closed by a cap or cover (45) having a threaded depending flange (46) to enter the annular wall or flange (6) and a lateral flange (47) to engage the upper face of the wall or flange (6) when the cover is in place, and tightly close the opening in the upper end of the shell or casing. The opening in the upper end of the shell or casing is of sufficient diameter to allow the diaphragm or capsule (33) to be dropped into position between the slidable valve (18) and the yieldable bumper (28), and when the diaphragm or capsule is inserted in position, the cap or cover (45) is threaded into place closing the trap or valve ready for use.

The threaded hole (23) of the boss (22) is of sufficient diameter to pass the valve (18) for insertion in its hole or mounting (19) and the yieldable bumper (28) with the coil spring (31) therearound and the nut (29) thereon is entered into the chamber (26) of the hollow plug and secured in place by the inturned lip (30) or otherwise, and the bumper (28) is properly adjusted so as to leave a space between its acting end and the end of the slidable valve (18) when the valve is in its open position, for the insertion of the chambered diaphragm or capsule between the ends of the valve and bumper and disengaged from both the valve and bumper, but in contact or nearly so with the ends of both the valve and bumper, so that as the chambered diaphragm or capsule expands it will force the slidable valve (18) horizontally and close the port (15) and with the contraction of the expansible chambered diaphragm or capsule to normal condition, allow the force or pressure of the water against the end of the slidable valve to open the port (15) for water of condensation to discharge.

A boss (48) is formed at the lower end or bottom of the shell or casing, and has a threaded hole (49) which receives a threaded stem (50) having a head (51) suitably formed for the application of a wrench or other tool by means of which the stem (50) can be advanced and receded in its threaded hole. The stem (50) extends across the discharge outlet (8) and, as shown, has a reduced section or portion (52) in line with the outlet passage and terminates in a threaded end or head (53) which enters and closes a threaded hole or port (54) in the wall (2), which hole or port (54) when open furnishes direct communication between the outlet passage (8) and the inlet passage (11), so that by receding or withdrawing the stem (50) and opening the hole or port (54) any sediment, dirt, or material collected in the inlet passage can be blown out and removed. This stem (50) and the hole or port (54) enable the trap or valve when first attached, or before using after the heating system has been shut down, to be blown out and cleaned, to do which it is only necessary to open the hole or port (54) by receding or withdrawing the stem (50), and this blowing out and cleaning effect extends to the heating unit or radiator to which the trap or valve is attached and in this way the entire heating system can be blown out and cleaned. After the blowing out and cleaning has been completed, the stem (50) can be advanced to close the hole or port (54), when the trap or valve and the heating system is again ready for use. It is to be noted that this blowing out and cleaning of the trap or valve and the heating system can be accomplished without removing the trap or valve, which is a desirable feature in the operating of heating systems.

The trap or valve can be attached to a radiator or heating unit by a coupling as shown, which coupling consists of a tailpiece (55) having a passage (56), an annular flange or lip (57), a seating face (58) to coact with a seating face (59) on the neck (9), and lugs or recesses (60) to be engaged by a screw-driver or other device to insert the tail-piece in the radiator or heating unit, and the connection is completed by a coupling nut (61), having a flange or lip (62) to engage the flange or lip (57), which nut threads on to the neck (9) as usual.

The operation will be understood from the foregoing description but briefly is as follows: The trap or valve is attached to the radiator or heating unit by the coupling and when attached the water of condensation from the radiator or heating unit will flow through the passage (56) of the tail piece (55) and enter the inlet passage (11) and rising therein will pass into the discharging chamber (10), the valve member (18) being receded as shown in Fig. 1 to open the port (15) for the inflow of the water. The water of condensation entering the discharging chamber will pass therefrom through the discharge passage or outlet and enter the return or discharge pipe (not shown) for final discharge at the place or point desired. The inflow of water will continue until the radiator or heating unit is relieved of the water of condensation, and will be followed by steam passing through the inlet passage (11) and port (15) and entering the discharging chamber, where it comes in contact with the thermostatic member, and causes the volatile liquid or medium in the chamber of the thermostatic member to vaporize and exert sufficient pressure to expand the walls or plates of the thermostatic member, and with such expansion the slidable valve member will be advanced or forced forward for its seating end (17) to close the port (15) and shut off the inflow of steam through the port. The thermostatic member will cool after the steam is shut off from the discharging chamber and such cooling will return the vaporized liquid or medium to its normal condition, allowing the walls or plates of the thermostatic member to contract and releasing the pressure or force against the slidable valve member for the pressure or force of the inflowing water of condensation to open the slidable valve member and permit the water to enter the discharging chamber to be discharged therefrom, such discharge continuing until steam again passes into the discharging chamber to act and expand the walls or plates of the thermostatic member and close the port (15) against further inflow of steam. This alternate opening and closing of the port (15) will continue as long as the trap or valve is in operation, relieving the radiator or heating unit of the water of condensation, and the operation will be automatic depending solely on the presence or absence of steam in the discharging chamber and the inflow of water into such chamber, the inflowing water opening the port (15) and the steam entering the discharging chamber closing such port.

The trap or valve of the present invention has many advantages among which may be named: the easy and ready assembling of the parts it only being necessary to enter the slidable valve member into position through the hole (23), then enter the chambered plug (24) (25) with the bumper (28) in place and properly adjusted into the threaded hole (23), then drop the thermostatic member (33) into position between the ends of the slidable valve member and the yieldable bumper, then applying the cap or closure (45), and finally attaching the coupling, completing the assembling of the parts or elements of the trap or valve ready for use; the replacing of a ruptured, broken or impaired thermostatic member to do which it is only necessary to remove the cap or closure, take out the thermostatic member, insert a new thermostatic member in place thereof, and apply the cap or closure; the keeping of the seating faces ground and in perfect condition for closing the port; the adjustment of the yieldable bumper to properly space the distance between its end and the end of the slidable valve member; the preventing of injury and ill-effects from over expansion of the thermostatic member or from over-pressure from the inflowing water, by means of the yieldable bumper; and the lessening of the care and attention required to maintain the trap or valve in operation. All of these advantages are found in the trap or valve of the present invention which embodies simplicity of construction, ease of adjustment, and perfection of operation.

What I claim as new is:

1. In a thermostatic trap, the combination of a casing having an inlet passage for water and having also a water discharging chamber and an outlet passage leading therefrom and a port furnishing communication between the inlet and chamber, a loosely mounted and freely slidable valve member controlling the port, a disconnected thermostatic member loosely supported in the water discharging chamber for actuating the valve, and a yieldable bumper externally engaging the thermostatic member and operating to prevent ill-effects from over-expansion of the thermostatic member, substantially as described.

2. In a thermostatic trap, the combination of a casing having an inlet passage provided with a sediment retaining section, and having also a water discharging chamber and an outlet passage leading therefrom, and a port furnishing communication between the inlet passage and the discharging chamber, a loosely mounted and freely slidable valve member controlling the port, a disconnected thermostatic member loosely supported in the water discharging chamber for actuating the valve in one direction, and a yieldable bumper externally engaging the thermostatic member and operating to prevent ill-effects from over expansion of the thermostatic member, substantially as described.

3. In a thermostatic trap, the combination of a casing having an inlet passage for water of condensation and having also a water discharging chamber and an outlet passage leading therefrom and a port furnishing communication between the inlet passage and the water discharging chamber, a loosely mounted and freely slidable horizontal valve member controlling the port, a disconnected vertical thermostatic member loosely supported in the water discharging chamber for actuating the valve in one direction, the inflowing water actuating the valve in the opposite direction, and a yieldable horizontal bumper externally engaging the thermostatic member and operating to prevent ill-effects from over-expansion of the thermostatic member, said thermostatic member loosely located between and unattached to the valve member and bumper, substantially as described.

4. In a thermostatic trap, the combination of a casing having an inlet passage provided with a sediment retaining section and having also a water discharging chamber and an outlet passage leading therefrom and a port furnishing communication between the inlet passage and the water discharging chamber, a loosely mounted and freely slidable horizontal valve member controlling the port, a disconnected vertical thermostatic member loosely supported in the water discharging chamber for moving the valve member to close the port, the inflowing water moving the valve member to open the port, and a yieldable horizontal bumper externally engaging the thermostatic member and operating to prevent ill-effects from over expansion of the thermostatic member, said thermostatic member loosely located and held between and unattached to the valve member and bumper, substantially as described.

5. In a thermostatic trap, the combination of casing having an inlet passage with a sediment section therein, a water discharging chamber, a port between the inlet passage and water discharging chamber and an outlet for the water discharging chamber, a loosely mounted and freely slidable horizontal valve member in the water discharging chamber, a disconnected vertically disposed thermostatic member loosely supported in the water discharging chamber, a yieldable bumper for preventing ill-effects of over expansion of the thermostatic member, the valve member and bumper unattached to the thermostatic member, and a threaded stem for blowing off the sediment section of the inlet passage, substantially as described.

6. In a thermostatic trap, the combination of a casing having an inlet passage provided with a sediment retaining section, and having also a water discharging chamber and an outlet therefrom and a port furnishing communication between the inlet passage and the water discharging chamber, a deflecting plate in the inlet passage, a loosely mounted and freely slidable horizontal valve member controlling the port, a disconnected vertically disposed and loosely supported thermostatic member for moving the slidable valve member to close the port, the inflowing water moving the valve member to open the port, and a yieldable horizontal bumper externally engaging the thermostatic member and operating to prevent ill-effects from over expansion of and over pressure on the thermostatic member, the valve member and bumper unattached to the thermostatic member, substantially as described.

7. In a thermostatic trap, the combination of a casing having an inlet passage, a water discharging chamber, a port between the inlet passage and the water discharging chamber, and an outlet passage for the water discharging chamber, a loosely mounted and freely slidable horizontal valve member in the water discharging chamber, a vertically disposed disconnected thermostatic member loosely supported in the water discharging chamber, and a yieldable bumper horizontally entered into the casing and between the end of which and the end of the slidable valve member the thermostatic member is loosely inserted, substantially as described.

8. In a thermostatic trap, the combination of a casing having an inlet passage, a water discharging chamber, a port between the inlet passage and the water discharging chamber, and an outlet passage for the water discharging chamber, said casing open at its upper end, a loosely mounted and freely slidable horizontal valve member in the water discharging chamber, a vertically disposed disconnected thermostatic member loosely supported in the water discharging chamber, a yieldable bumper horizontally entered into the casing and between the end of which and the end of the slidable valve member the thermostatic member is loosely inserted, and a cap for closing the open upper end of the casing, substantially as described.

9. In a thermostatic trap, the combination of a casing having an inlet passage, a water discharging chamber, a port between the inlet passage and the water discharging chamber, and an outlet for the water discharging chamber, said casing having an open upper end, a freely slidable horizontal valve member in the water discharging chamber, a vertically disposed disconnected thermostatic member loosely supported in the water discharging chamber and consisting of a chambered diaphragm containing a volatile liquid, a yieldable bumper horizontally entered into the casing and between the end of which and the end of the slidable valve member the thermostatic member is loosely inserted, and a cap for closing the open upper end of the casing, substantially as described.

10. In a thermostatic trap, the combination of a casing having an inlet passage, a water discharging chamber, a port between the inlet passage and the water discharging chamber and an outlet for the water discharging chamber, said casing having an open upper end, a freely slidable horizontal valve member in the water discharging chamber, a vertically disposed disconnected thermostatic member loosely supported in the water discharging chamber and consisting of a chambered diaphragm containing a volatile liquid, a yieldable bumper horizontally entered into the casing and consisting of a chambered plug, a slidable member, a nut and a spring, the end of the slidable member of the bumper and the end of the freely slidable valve member having the thermostatic member loosely inserted between them, and a cap for closing the open upper end of the casing, substantially as described.

11. In a thermostatic trap, the combination of a casing having an inlet passage, a water discharging chamber, a port between the inlet passage and the water discharging chamber, said casing having an open upper end, a freely slidable horizontal valve member, a cross-bar in the water discharging chamber in which the slidable valve member is loosely mounted, a vertically disposed disconnected thermostatic member loosely supported in the water discharging chamber and consisting of a chambered diaphragm containing a volatile liquid, a yieldable bumper horizontally entered into the casing and consisting of a chambered plug, a slidable member, a nut, and a spring, the end of the slidable member of the bumper and the end of the freely slidable valve member having the thermostatic member loosely inserted between them, and a cap for closing the open upper end of the casing, substantially as described.

12. In a thermostatic trap, the combination of a casing having an inlet passage with a sediment retaining section, a water discharging chamber, a port between the inlet passage and the water discharging chamber and an outlet for the water discharging chamber, a freely slidable horizontal valve member in the water discharging chamber, a vertically disposed disconnected thermostatic member loosely supported in the water discharging chamber and consisting of a chambered diaphragm containing a volatile liquid, a yieldable bumper horizontally entered into the casing, and between the end of which and the end of the freely slidable valve member the thermostatic member is loosely inserted, a cap for closing the open upper end of the casing, and means for blowing off the sediment section of the inlet passage, substantially as described.

JAMES H. MARTIN, Jr.

Witnesses:
OSCAR W. BOND,
LOUIS M. BERWIN.